May 17, 1966  H. MULLER  3,251,468
METHOD AND APPARATUS FOR FILTERING RESIDUAL SLURRY
Filed Jan. 30, 1962

Inventor:
HANS MULLER
By Shoemaker and Mattare
Attys.

United States Patent Office 3,251,468
Patented May 17, 1966

3,251,468
METHOD AND APPARATUS FOR FILTERING
RESIDUAL SLURRY
Hans Muller, Erlenbach, Zurich, Switzerland
Filed Jan. 30, 1962, Ser. No. 169,723
Claims priority, application Switzerland, June 11, 1955,
20,822/55; Sept. 29, 1955, 24,823/55; Oct. 28, 1955,
25,970/55
12 Claims. (Cl. 210—66)

The present application is a continuation-in-part of my U.S. patent application, Serial No. 814, 427, filed May 20, 1959 and entitled "Filter Apparatus," now U.S. Patent No. 3,190,449 issued June 22, 1965, which application, Serial No. 814,427, in turn is a division of my U.S. patent application, Serial No. 590,656, filed June 11, 1956, now abandoned.

In filters with horizontal filter plates, plates which are pervious only on top have been used recently. The filter cake accordingly builds up only on the top of the filter plates. The whole filter pack is normally inserted in a vertical cylindrical tank or other container.

A certain disadvantage of these filters consists, however, in that after a filtration operation, a relatively large volume of unfiltered liquid is left in the container and cannot be filtered off. It is indeed possible, by means of a pressure process following filtering, to expel part of the residual liquid through the filter or the filter elements by means of compressed air or compressed gas. But as soon as the liquid level sinks so far that the upper filter plates project out of the liquid, the compressed air or the compressed gas gradually begins to escape through these plates or through the filter cakes on them. The pressure in the filter drops and the resulting drying leads to the formation of cracks in the exposed filter cakes, whereby the compressed air or gas passes through the filter plates to an increased degree and finally completely. Filtration thereby ceases. In many cases, therefore, only half or even a third of the liquid still present in the filter tank can be filtered off.

Attempts have indeed already been made to eliminate this deficiency by connecting to the main filter an additional, considerably smaller filter. This probably makes it possible to obtain a certain improvement, since a further part of the liquid can be treated and a larger amount of filtrate gained, but the residue left in the smaller filter is nevertheless a loss. This arrangement has the further disadvantage of a comparatively expensive additional apparatus, which takes up extra space.

In order to eliminate these disadvantages, that is to say, to filter off the last remains of liquid completely, the invention proposes the moistening of the filter cake or cakes on the plates from which liquid has receded in the course of the filtering process. The liquid supplied keeps wet the filter cake or cakes from which the filter liquid has already receded, and thus prevents the compressed air or gas from penetrating through the cake layer. It also prevents cracks from forming in the cake. It is convenient for the moistening of the filter cake or cakes to take place from above in the manner of a cascade by applying liquid on to the appropriate plates.

It is particularly advantageous, if, according to a further embodiment of the invention, the residual liquid in the filter is used for moistening. It is sucked off from the bottom of the filter and brought onto the topmost plate. A pump, set at the lowest point of the filter tank, is used to provide the suction. In order to avoid washing the filter cake, a distributor plate with holes can be mounted above the topmost filter plate, which guarantees an even, fine distribution of the liquid onto the filter plate. The excess of liquid drops from the topmost plate over its edge onto the next plate and from there accordingly further. By simultaneously putting the filter under pressure with compressed air or compressed gas, the last remains of liquid can be filtered off, since the filter plates remain wetted, and consequently the filter cake forms a closed mass preventing penetration of the compressed gas, until there is no longer any liquid present in the filter.

The filter plates can be provided outside with additional sheet metal guides, which ensure that the liquid flowing over the edge of the element is evenly distributed onto the next filter plate.

Instead of this sheet-metal guide other types of drip rims can also be provided, or a distribution plate provided with holes can be fitted under each filter plate, preferably having a somewhat larger diameter than the filter plate itself, so that the liquid can be efficiently collected.

The accompanying drawing illustrates the invention by way of example.

FIG. 3 shows an elevated, fragmentary cross-sectional view of a filter plate which is pervious only at the top; and FIG. 4 illustrates an arrangement wherein pierced distribution plates are arranged between the filter plates.

Figures 1, 2:
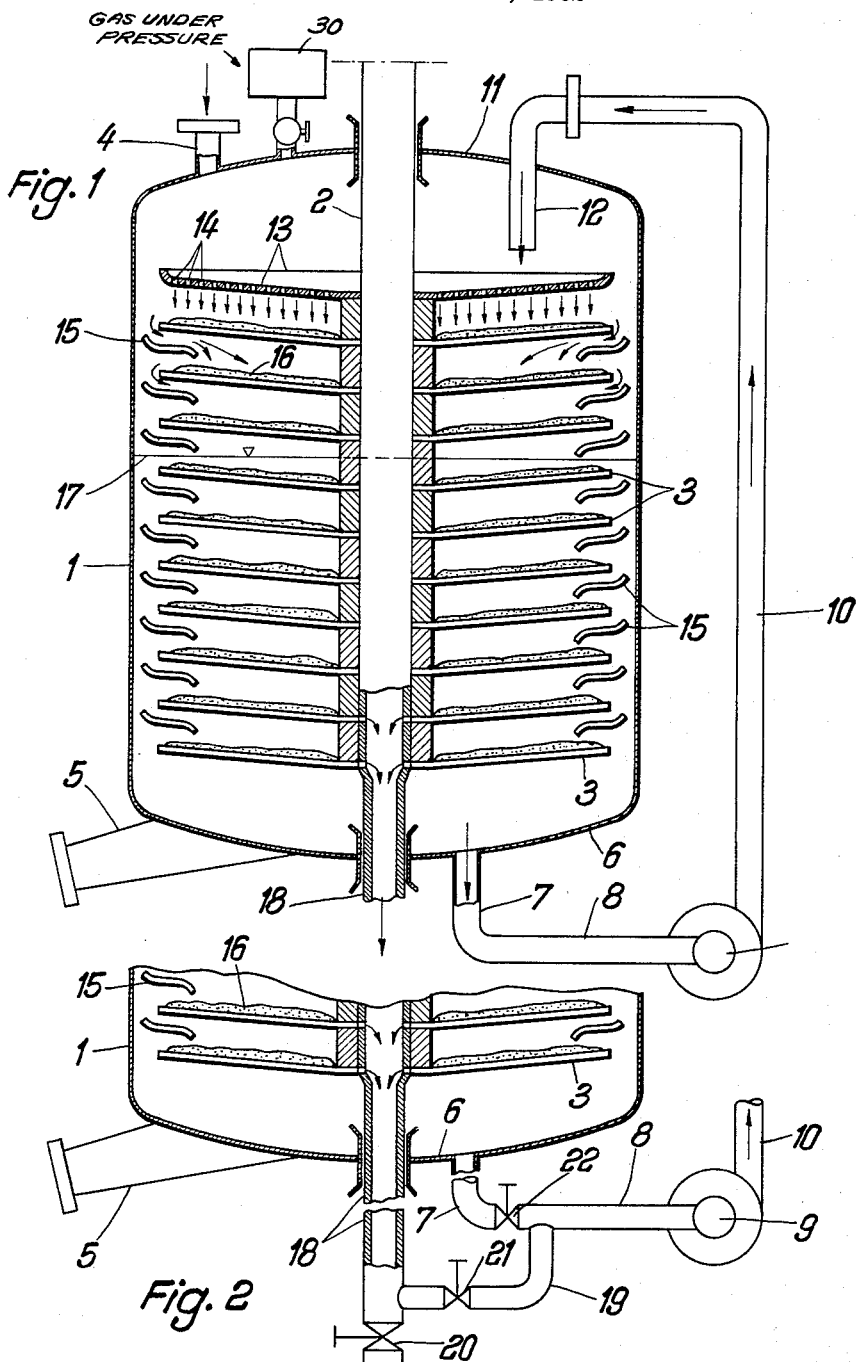
FIG. 1 shows schematically a vertical section through a filter.
FIG. 2 shows the lower part of the filter tank with a special device.

In the filtering tank 1 a series of filter elements or filter plates 3 are mounted one above the other on a vertical hollow shaft 2. The filter plates 3 are somewhat inclined to the shaft 2, so that the filtrate in them can flow away better than if they were exactly horizontal. Moreover, an inclination is also advantageous in that it provides for an even overflow over the whole edge of the filter element. The liquid collects on the top of the element as in a trough, and when this is full the overflow takes place around it. In this way the cake lying below is prevented from the outset from being moistened or impinged on one side.

At the top of the tank 1 a connecting pipe 4 is provided, through which the liquid to be filtered is led to the interior of the tank 1. There is also provided and indicated by reference numeral 30 a means for introducing gas under pressure into tank 1. A connecting pipe 5 at the base 6 of the tank 1 serves in known manner to discharge the residue when the filtering process is over. The manner of discharging the residue as referred to hereinabove is disclosed for example in the American Journal "Chemical and Process Engineering," of January 1963, page 31. A further outlet connecting pipe 7 in the base 6 of the tank leads through a duct 8 to a pump 9. From the pump 9 a duct 10 extends to the cover 11 of the filter tank 1 and through this to the interior of the tank. It ends in a discharge pipe 12 above the highest filter element, arranged so that the liquid issuing from it is distributed as evenly as possible over the top of the element. For this purpose a baffle or distributor plate (not shown) or the like can be fastened at the outlet of the pipe 12. But it is advantageous to use a distribution plate 13 which is provided with an edge, is slightly trough-like in shape and has holes 14 over its entire surface. The distribution plate thus acts like the spraying head of a watering can or a sprinkler.

As illustrated, in FIG. 3, distribution plates 13' with holes 14 are arranged between all of the filter plates 3. Distribution plates 13' are of somewhat larger diameter than top distribution plate 13 and filter plates 3, and have upwardly directed outer edges in order to catch unfiltered liquid flowing over the edge of the superposed filter plate.

Annular sheet-metal deflectors 15 can be arranged between the individual filter plates 3. These deflectors safely guide and distribute the liquid running over the edge of each element onto the filter plate fitted below and/or onto the cake 16 lying on the plate.

The process according to the invention is conducted as follows. When, towards the end of the filtering process, the liquid in the tank has sunk to the level 17 due to the admission of compressed gas or air, and the point is reached at which the filter cake 16 of the unimmersed plates 3 begins to become pervious to the compressed medium or even tends to form cracks, then the liquid below the level 17 is gradually sucked off by the pump 9. It trickles through the duct 10, the connecting pipe 12 and the distribution plate 13 onto the uppermost filter plate. One part of it is filtered through this plate with the aid of the compressed medium, and another, generally larger part flows away over the edge of the element and, as a result of deflection by the sheet-metal deflector 15 mounted between the edges of the filter plates, arrives on the plate 3 below. Here the described process is repeated, as it is with all the subsequent plates. In this way the filter fluid can be completely filtered off.

The process according to the invention can also be used when the filter cake must be washed out or extracted out with only a little liquid, for example in pharmaceutical chemistry.

For this purpose a branch duct 19 is mounted in the outlet pipe 18 of the hollow shaft (FIG. 2). This duct 19 connects the pipe 18 with the duct 8. Valves 20, 21 and 22 permit their associated ducts to be shut off according to the requirements for the flow or liquid.

In this application only a little liquid is put into the filter tank, e.g. one-third of the volume. This liquid is circulated by the pump 9, the suction of the pump taking place at the run-off for clear liquid 18. The valves 20 and 22 are shut, the shut-off member 21 is opened. The same liquid is thus passed several times through the filter cake or cakes 16.

Referring now to FIG. 4, one half of a filter plate 3 is shown the interior cavity 23 of which communicates with the interior of hollow shaft 2 through channels 24. Spacing rings 25 maintain the filter plate in the desired position. Bottom 27 of filter plate 3 is downwardly inclined towards hollow shaft 2 and has an outer edge extending substantially vertically in upward direction. Filter cloth or screen 26 is fixed to the lower face of upper spacing ring 25 and to the upwardly extending outer edge of bottom 27. During filtration, filter cake 16 will be formed on filter cloth 26.

I claim:

1. In a process of filtering the residual liquid from a disc filter having a plurality of substantially horizontally disposed filter plates pervious only at the upper portions thereof and disposed in vertically spaced relationship one over the other within a container which is substantially filled with liquid, the steps of introducing gas under pressure into said container and lowering the liquid level in the container to cause the liquid to recede from the top portion of the container toward the lower portion thereof and while such gas under pressure exists in said container, moistening the filter cake on the upper portion of each of said plates, from which liquid has receded in the course of the filtering process, by sucking residual liquid still present in the container from the lower portion of the container and applying such residual liquid to the said filter cake on each of said last-mentioned plates.

2. The process as defined in claim 1 wherein each of the filter cakes is moistened from above in the manner of a cascade.

3. Filter apparatus comprising a container, a plurality of substantially horizontally disposed filter plates pervious only at the upper portions thereof and disposed in vertically spaced relationship one over the other within said container, outlet means in said container for receiving filtered liquid from all of said plates, inlet means for introducing unfiltered liquid into said container, outlet means for removing unfiltered liquid from said container, means for applying liquid to the filter cake on the upper portion of each of said plates to moisten the filter cake on any plate not immersed in unfiltered liquid, and means for introducing compressed gas into the container simultaneously with applying liquid to the filter cake on the upper portion of plates not immersed in unfiltered liquid.

4. Apparatus as defined in claim 3 wherein said means for applying liquid to the filter cake includes pump means for removing unfiltered liquid from the lower part of said container and means for applying such liquid to the filter cakes on any plate that is unimmersed in liquid.

5. Apparatus as defined in claim 3 including distribution plates disposed between said filter plates, one distribution plate being disposed between each adjacent pair of filter plates and having spaced holes formed therein.

6. Apparatus as defined in claim 3 wherein each of said filter plates is substantially disc-shaped in configuration with the lowermost portion thereof at the central part thereof such that liquid tends to run down each plate to the central portion thereof and into the central outlet means.

7. Filter apparatus comprising a container, a plurality of substantially horizontally disposed filter plates pervious only at the upper portions thereof and disposed in vertically spaced relationship one over the other within said container, outlet means in said container for receiving filtered liquid from all of said plates, inlet means for introducing unfiltered liquid into said container, outlet means for removing unfiltered liquid from said container, means for applying liquid in a downward direction, substantially uniformly over the topmost filter plate so as to moisten the filter cake thereon when the topmost filter plate is unimmersed in liquid, the liquid so applied in a downward direction to topmost plate when sequentially overflowing the various plates therebeneath so as to moisten the filter cakes on the succeeding plates from above when such filter cakes are not immersed in unfiltered liquid, and means for introducing compressed gas into said container simultaneously with applying liquid over said topmost filter plate.

8. Apparatus as defined in claim 7 wherein said means for applying liquid to the topmost filter cake in a downward and uniform direction includes a distribution plate having a plurality of spaced apertures formed therethrough.

9. Apparatus as defined in claim 7 wherein said means for applying liquid to the topmost filter cake includes pump means for removing unfiltered liquid from the lower portion of the container and for pumping such liquid to the upper portion of the container.

10. Apparatus as defined in claim 7 including deflector means disposed intermediate adjacent pairs of said filter plates between the outer peripheries thereof for evenly distributing the liquid from one filter plate to the next filter plate immediately therebelow.

11. Apparatus as defined in claim 7 including a plurality of distribution plates having spaced formed therethrough, each of said distribution plates being disposed between an adjacent pair of said filter plates.

12. Apparatus as defined in claim 7 wherein each of said filter plates are slightly inclined to the horizontal from the outer portions thereof toward the inner portions thereof so that liquid runs toward the center portions thereof and to the outlet means.

References Cited by the Examiner
UNITED STATES PATENTS

| | | | |
|---|---|---|---|
| 685,881 | 11/1901 | Theurer | 210—344 |
| 2,839,194 | 6/1958 | Lopker | 210—66 |

FRANK W. LUTTER, *Primary Examiner.*

HARRY B. THORNTON, *Examiner.*